Aug. 26, 1958   F. C. PLUMMER, SR., ET AL   2,848,778
FISHING LINE REWINDER
Filed Oct. 30, 1953
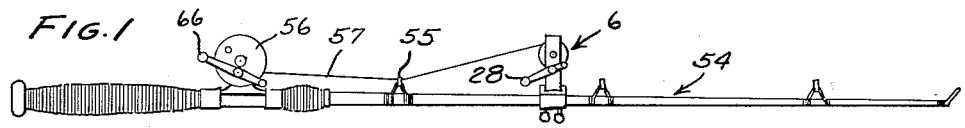
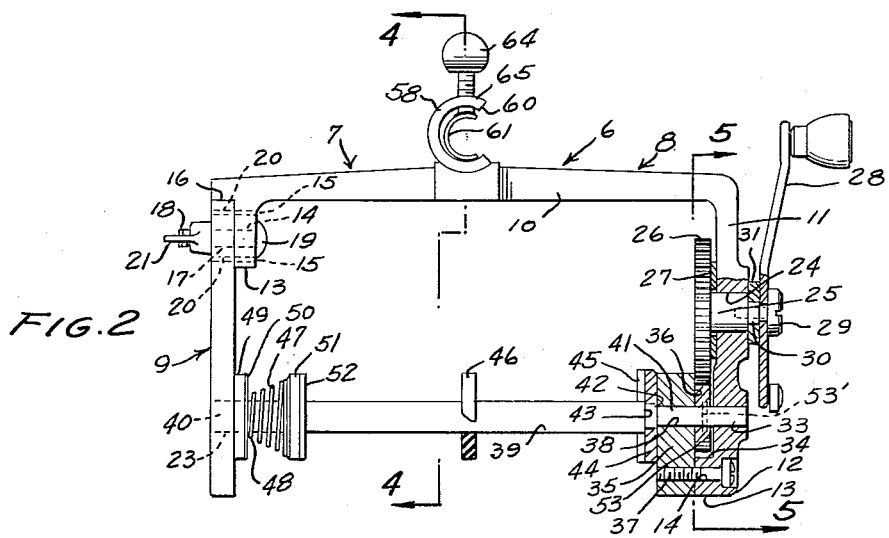
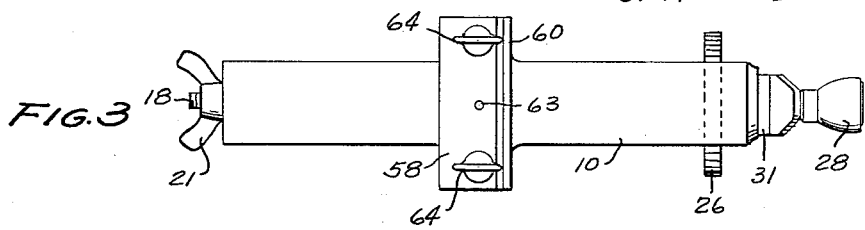
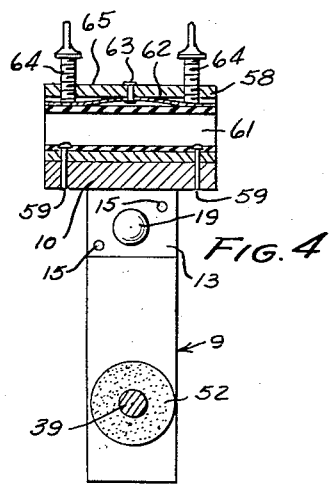
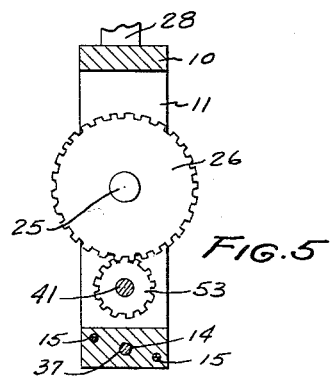
INVENTORS
FRANCIS C. PLUMMER, SR.
+ FRANCIS C. PLUMMER, JR.
BY
McMorrow, Berman + Davidson
ATTORNEYS

2,848,778
FISHING LINE REWINDER

Francis C. Plummer, Sr., and Francis C. Plummer, Jr., Oakland, Calif.

Application October 30, 1953, Serial No. 389,264

2 Claims. (Cl. 24—243)

This invention relates to a fishing line rewinder for winding and unwinding fishing line from fishing reels onto spools and from spools onto fishing reels, and more particularly to a device of this kind which is devised for removable mounting on a fishing rod or pole in conjunction with a fishing reel thereon.

Among important objects of the invention are to provide an efficient and practical device of the character indicated above whose operation enables quick, easy, even and uniform winding and unwinding or rewinding of fishing line under desirable tension by one person; which prevents the tangling, snagging, and kinking of fishing line which otherwise render winding and rewinding difficult for one person to perform and which severely damages certain types of fishing line; and which can be made in a rugged, serviceable, and attractive form at relatively low cost.

Other important objects and advantageous features of the invention will be apparent from the following description and the accompanying drawings, wherein, for purposes of illustration rather than limitation, a specific embodiment of the invention is set forth in detail.

In the drawings:

Figure 1 is a side elevation showing the embodiment installed on a fishing rod;

Figure 2 is an enlarged front elevation of said embodiment, partly in section;

Figure 3 is a top plan view of Figure 2; and

Figures 4 and 5 are transverse vertical sections taken on the lines 4—4 and 5—5, respectively, of Figure 2.

Referring in detail to the drawings, wherein like numerals designate like parts throughout the several views, the illustrated device, which is generally designated 6, comprises a rigid U-shaped preferably metal frame 7 involving a reclining L-shaped section 8 and a straight section 9.

The frame section 8 comprises the spacer bar 10 which is preferably integral at one end with a right angular arm 11, and has spaced from the other end 12 a right angular lug 13 provided with a central bore 14 and with dowels 15, 15 at opposite sides of the bore 14.

The straight frame section 9 has near one end 16 a bore 17 which removably accommodates a bolt 18 passed through the mentioned lug bore 14 and having a head 19 engaged with the laterally inward side of the lug 13. The end 16 of the frame section 9 is engaged with the spacer bar 10 with the adjacent side of the section 9 engaged with the laterally outward side of the lug 13. The section 9 has dowel holes 20, 20 receiving the dowels 15, 15, and a finger nut 21 is threaded on the bolt 18 against the laterally outward side of the section 9. Near its other end 22 the section 9 has a shaft bearing hole 23.

The arm 11 of the frame section 8 has at a point intermediate its ends a journal hole 24 through which extends a gear wheel shaft 25 having a fixed gear wheel 26 located at the laterally inward side of the arm 11, with a washer 27 interposed between the arm 11 and the gear wheel 26. The gear wheel 26 and shaft 25 are manually turned by a balanced crank handle 28 which is secured to the lateral end of the shaft 25 by a headed screw 29 whose shank 30 traverses an intermediate part of the handle 28 and threads into the shaft 25, with a spacer washer 31 interposed between the handle 28 and the adjacent end of the shaft 25.

At a point above the lower end of the frame section arm 11 is a shaft bearing hole 33, and a laterally inwardly extending boss 34 is provided on the arm below the bearing hole 33.

A fishing line spool shaft 39 has an end 40 journalled in the shaft bearing hole 23 of the frame section 9 and has at its other end a reduced portion 41 which is journalled in the bearing holes 38 and 33 of the bearing block 35 and the frame arm 11, respectively. A thrust shoulder 42 defined by the reduction of the shaft 39 bears against the laterally rearward side of the block 35, and another shoulder 43 serves to retain in place against the block 35 a thrust washer 44 on the shaft 39 which has a compressible face 45 on its laterally inward side.

A slidable, preferably rubber, disc 46 is circumposed on an intermediate part of the shaft 39.

A conical tensioning or clamping spring 47 is circumposed on the shaft 39 near the frame section 9, and its smaller or laterally outward end 48 bears against a washer 49 slidable on the shaft 39 and having a compressible laterally inward face 50, the laterally inward and longer end of the spring 47 bearing against a slidable washer 51 circumposed on the shaft 39 and having a compressible laterally inward face 52.

Drive connection between the handle operated gear wheel 26 is through a pinion 53 pinned on the reduced shaft portion 41 by a pin 53′, the pinion 53 being located in the space between the bearing block 35 and the frame arm 11.

The above described device is adapted to be removably mounted on a fishing rod 54, preferably forwardly of a line guide 55 which is located forwardly of a fishing line reel 56 on the rod 54, the line 57 being passed through the guide 55 between the reel 56 and the device 6.

The device 6 is mounted on the rod 54 by means of clamping means which is preferably composed of a split metal tube 58 secured by suitable means such as rivets 59, 59 across the top of the center of the frame spreader bar, with its open side facing laterally outwardly, the opening 60 being large enough to pass any contemplated fishing rod. A split compressible tubular lining 61 is secured within the split tube 58. A leaf spring 62 extends lengthwise of the split tube 58 along the underside of the top thereof above the lining 61 and is secured in place by a rivet 63 located intermediate its ends. Handle equipped clamping screws 64, 64 traverse opposite end portions of the top part 65 of the split tube 58 for engaging opposite free end portions of the spring 62 to clamp a fishing rod disposed in the tube 58 within the lining 61.

To install one or more fishing line spools (not shown) on the shaft 39, the frame section 9 is removed from the section 8, the washer 49, spring 47, and washer 51 removed from the shaft 39, and a spool or spools placed thereon. The washer 49, spring 47, and washer 51 are then replaced on the shaft 39 so that a spool is frictionally clamped between the washer 52 and the disc 46 to afford the desired line drag to maintain the fishing line 57 sufficiently tensioned. Either the rewinder handle 28 or the handle 66 of the reel 56 is then operated, according to whether the line is to be wound onto the reel 56 from a spool, or from the reel 56 onto a spool.

What is claimed is:

1. In a fishing line rewinder, a clamp comprising a split fishing rod receiving tube having a longitudinal opening, a split tubular liner of compressible material positioned within said tube, said liner having a longitudinal opening coinciding with the longitudinal opening of the tube, means located at one side of said longitudinal opening securing said liner to the tube, a leaf spring positioned within said tube between said tube and said liner at the other side of said longitudinal openings, said spring being fixed to the tube and being elongated in the direction of the length of said tube and having a free end, and a screw traversing said tube and bearing against said free end.

2. In a fishing line rewinder, an elongated clamp comprising a split fishing rod receiving tube having a longitudinal opening, an elongated split tubular compressible liner within said tube, said liner having a longitudinal opening coinciding with the longitudinal opening of the tube, an elongated leaf spring substantially as long as and positioned within said tube and located between said tube and said liner and positioned at one side of said longitudinal openings, said spring being fixed at a point intermediate its ends to the tube and being elongated in the direction of the length of said tube and having a free end, and a screw traversing said tube and bearing against said free end, and means securing said liner to said tube at the opposite side of the tube from said spring, said liner being otherwise unsecured to the tube.

References Cited in the file of this patent

UNITED STATES PATENTS

| | | |
|---|---|---|
| 254,881 | McClure | Mar. 14, 1882 |
| 535,793 | Foster | Mar. 12, 1895 |
| 687,942 | Sanders | Dec. 3, 1901 |
| 870,475 | Shaffer | Nov. 5, 1907 |
| 1,120,821 | Kennelly | Dec. 15, 1914 |
| 1,194,943 | Broling | Aug. 15, 1916 |
| 1,262,519 | Kline | Apr. 9, 1918 |
| 1,663,766 | Landis | Mar. 27, 1928 |
| 1,971,000 | Field | Aug. 21, 1934 |
| 2,047,705 | Porter | July 14, 1936 |
| 2,482,192 | MacDonald | Sept. 20, 1949 |
| 2,650,404 | Dalpiaz | Sept. 1, 1953 |
| 2,659,573 | Smith | Nov. 17, 1953 |
| 2,666,972 | Strobel | Jan. 26, 1954 |

FOREIGN PATENTS

| | | |
|---|---|---|
| 195,064 | Germany | Dec. 28, 1906 |
| 907,005 | Germany | Mar. 18, 1954 |